2,954,377
Patented Sept. 27, 1960

2,954,377

DICHLORO-S-TRIAZINE DERIVATIVES AND PROCESS FOR THEIR PRODUCTION

Werner Schwarze, Frankfurt am Main, Germany, assignor to Deutsche Gold- und Silber-Scheideanstalt vormals Roessler, Frankfurt am Main, Germany No Drawing. Filed Nov. 24, 1958, Ser. No. 775,708

Claims priority, application Germany Nov. 28, 1957

3 Claims. (Cl. 260—243)

The present invention relates to novel dichlorotriazine derivatives and a process for their production.

The novel dichlorotriazine derivatives according to the invention are of the following formula:

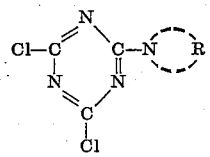

wherein $$\overset{\frown}{R}$$

represents a divalent radical of an aromatic ring system containing the nitrogen atom shown.

These novel dichloro-s-triazine derivatives cannot be prepared by the previously known processes for the production of N-substituted dichlorotriazines, such as, for example, 2-anilido-4,6-dichlorotriazine, which customarily has been prepared by reacting aniline with cyanuric chloride in water or organic solvents at low temperatures and neutralizing the HCl set free with the aid of an acid acceptor, for example, with a base such as aqueous NaOH, sodium carbonate or sodium bi-carbonate.

While all previously prepared N-substituted dichlorotriazines possess a certain basicity and can form salts with acids, the novel N-substituted dichlorotriazines in which the substituted N atom is contained in an aromatic ring system do not form salts with acids.

According to the invention it was found that the novel N-substituted dichloro-s-triazines indicated above can be produced by reacting cyanuric chloride with a compound of the formula

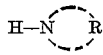

at temperatures between 80 and 250° C. in the presence of an organic polar solvent which does not react with cyanuric chloride, such as aromatic nitriles, higher alkyl nitriles, nitro alkanes and nitro benzenes, for example, nitromethane, nitroethane, nitrobutane, nitrooctane, nitrobenzene, chloronitrobenzene, benzonitrile, butylnitrile and the like, and during the progress of the reaction passing an inert gas, such as nitrogen, through the reaction mixture to drive out the HCl formed.

The aromatic nitrogen containing compounds suitable for reaction with cyanuric chloride for the production of the compounds according to the invention are indole, carbazole, phenoxazine, phenothiazine and azaphenothiazine.

The novel compounds according to the invention possess fungicidal properties when tested against Alternaria brassicae. The dichlorocarbazole and dichloronitrocarbazole compounds being particularly effective. The phenothiazine and azaphenothiazine compounds in which the benzene ring may also be substituted are pharmaceutically active as sedatives. The chlorine atom on the triazine ring of the compounds according to the invention can also be replaced by amino or sulfonamide groups to produce compounds having pharmaceutical activity.

It is very interesting, also, that when cyanuric chloride is reacted with indole, employing nitrobenzene as the solvent, the nitrobenzene enters into the reaction to form diindole which reacts with the cyanuric chloride to form diindolyl-dichlorotriazine of the formula

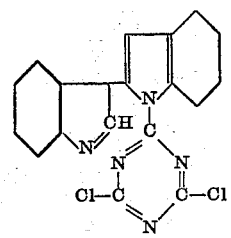

The following examples will serve to illustrate several embodiments of the invention.

Example 1

184.5 g. cyanuric chloride (1 mol) and 200 g. of technical phenothiazine were heated in 1 liter of nitrobenzene for 1½ hours at 135–150° C. while passing nitrogen through the reaction mixture to entrain the HCl formed. .95 mol of HCl were liberated during this period.

The nitrobenzene was then distilled off under vacuum and the distilled residue taken up in benzine. The mass which soon crystallized out was recrystallized from toluene. 215 g. (62% of the theoretical) of N-phenothiazinyl dichlorotriazine of the formula

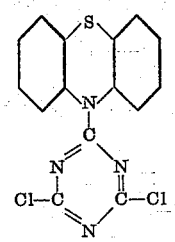

were obtained as light yellow crystals having a M.P. of 252–253° C.

When butyl cyanide was used as the solvent and the reaction mixture heated for 2 hours at 135° C., a 38% yield of the N-phenothiazinyl dichlorotriazine was obtained.

Example 2

100 g. of carbazole and 111 g. cyanuric chloride were heated in 800 cc. of nitrobenzene for 9 hours at 195° C. while passing nitrogen through the reaction mixture. The resulting solution was then concentrated under vacuum and the residue directly recrystallized from toluene. 121 g. of golden yellow crystals of N-carbazolyl dichlorotriazine of the formula

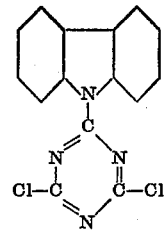

having a M.P. of 237° C. were obtained.

Example 3

20 g. of 4 azaphenothiazine, 18.5 g. of cyanuric chloride and 150 cc. of nitrobenzene were heated for 3 hours at 160° C. while passing nitrogen through the reaction mixture. During this period 0.092 mol of HCl was liberated. Upon removal of the solvent and recovery of the condensation product in a manner analogous to that described above, 11.5 g. of the condensation product 2 azaphenothiazinyl dichlorotriazine in the form of orange crystals having a M.P. of 258° C. were obtained. The formula of the product is

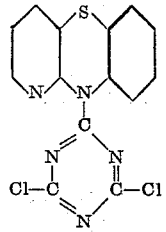

Example 4

48 g. of indole and 74 g. of cyanuric chloride in 600 cc. of nitrobenzene were heated to 100–110° C. for 2 hours with stirring and passage of nitrogen through the reaction mixture. The reaction product was recovered as described above and recrystallized from benzine. 61.5 g. of di-indolyl-dichlorotriazine were obtained in the form of light yellow crystals having a M.P. of 200° C.

Example 5

20 g. of 3 nitrocarbazole and 17.4 g. of cyanuric chloride were boiled under reflux in 50 cc. of nitrobenzene for 10 hours while passing nitrogen through the reaction mixture. The reaction mixture was concentrated under vacuum and the residue taken up in benzine and then filtered off on a suction filter. Upon recrystallization, 18 g. of the condensation product N-(3-nitrocarbozolyl)-dichlorotriazine having a M.P. of 246–248° C. were obtained. The structural formula thereof is

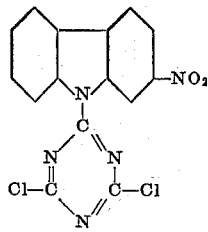

I claim:
1. A dichloro-s-triazine derivative of the following formula

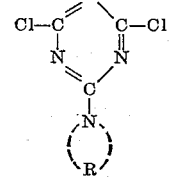

in which

represents a radical selected from the group consisting of unsubstituted phenothiazinyl and azaphenothiazinyl radicals.

2. A dichloro-s-triazine derivative according to claim 1 wherein

represents an unsubstituted phenothiazinyl radical.

3. A dichloro-s-triazine derivative according to claim 1 wherein

represents an unsubstituted azaphenothiazinyl radical.

References Cited in the file of this patent

UNITED STATES PATENTS

| | | |
|---|---|---|
| 2,092,352 | Jensch | Sept. 7, 1937 |
| 2,535,968 | Thurston et al. | Dec. 26, 1950 |
| 2,713,046 | Williams et al. | July 12, 1955 |
| 2,720,480 | Wolf | Oct. 11, 1955 |
| 2,820,032 | Hill | Jan. 14, 1958 |

OTHER REFERENCES

Chemical Abstracts, vol. 51, col. 2186 (1957) [abstract of Menon et al., Chemistry and Industry (1956), pp. 717–718].

Wolf et al.: Science, vol. 12, pp. 61–62 (1955).

Koopman: Chem. Abst., vol. 52, p. 14627 (1958), citing Rec. trav. chim. vol. 77, pp. 235–240 (1958).

Foye et al.: Chem. Abst., vol. 51, p. 17943 (1957), citing J. Am. Pharm. Assoc., vol. 46, pp. 366–370 (1957).

Detweiler et al.: J. Am. Chem. Soc., vol. 74, pp. 1483–1485 (1952).

Saure: Chemische Berichte, vol. 83, pp. 335–340 (1950).